Figure 1:
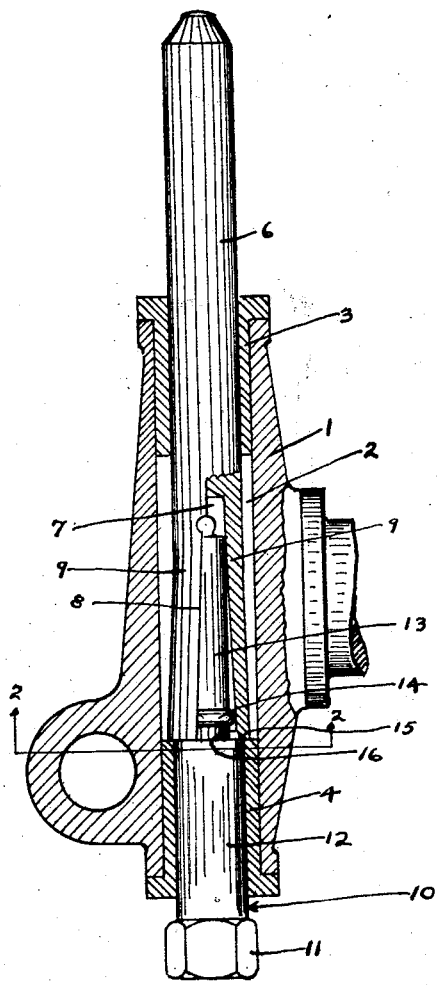

July 7, 1925.

G. W. DOVER

BUSHING REMOVER

Original Filed Jan. 27, 1922

1,544,820

INVENTOR.
George W. Dover
BY Perley H. Plant
ATTORNEY.

Patented July 7, 1925.

1,544,820

UNITED STATES PATENT OFFICE.

GEORGE W. DOVER, OF CRANSTON, RHODE ISLAND, ASSIGNOR, BY DIRECT AND MESNE ASSIGNMENTS, TO THE MONTGOMERY TOOL AND MACHINERY COMPANY, A CORPORATION OF RHODE ISLAND.

BUSHING REMOVER.

Application filed January 27, 1922. Serial No. 532,331. Renewed December 6, 1924.

*To all whom it may concern:*

Be it known that I, GEORGE W. DOVER, a citizen of the United States, residing at Cranston, in the county of Providence and State of Rhode Island, have invented certain new and useful Improvements in Bushing Removers, of which the following is a specification.

This invention relates to an improved bushing remover which has been found to be particularly useful in removing separated bushings such, for example, as are now commonly employed in certain parts of automobiles.

One object of my invention is to provide a two-part tool which is of simple construction and capable of being employed to remove bushings of this character without danger of becoming broken or wedged into the bearing, and which is so formed that the parts mutually guide each other when in operation to prevent tilting of the parts out of the axis of the bearing with consequent danger of injury to the bearing or the tool.

Another object of the invention is to provide a stop upon one of said members for limiting the relative movement of said members in one direction to facilitate the use of the structure and prevent injury to the parts.

Other objects and advantages of the invention relate to certain details of construction and improved methods of operation as will be more fully set forth in the brief description to follow.

Figure 2:
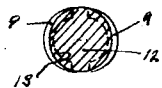

Referring to the drawings:

Fig. 1 is vertical sectional view through the front axle spindle of an automobile, showing the parts of the tool in operative position, certain portions of the tool being broken away to more clearly illustrate the construction of the parts and their arrangement, when in operative position, and, Fig. 2 is a detail sectional view of the tool taken along the line 2—2 of Fig. 1 to show the engagement of the stop shoulder on one of the members with the ends of the flexible fingers.

In devices of this character which have heretofore been employed considerable difficulty has been experienced in maintaining the operating parts of the tool in a proper position of alignment relative to each other as well as in preventing undue extension of the flexible fingers in the hands of inexperienced and unskilled operatives, with consequent breakage of the tool parts and injury to the bearing. In order to overcome these difficulties and facilitate the operation of removing bushings by means of devices of this character I have provided a two-part tool wherein the parts are adapted to move in a straight line in the direction of their axes and the parts are so formed as to guide each other in their relative movement as well as to limit the extent of relative movement of the parts whereby excessive movement of the parts toward each other is prevented and consequent injury to the same avoided.

In the embodiment of the invention illustrated herewith 1 designates a front axle spindle of the usual construction provided with a vertical bore 2 in which are positioned upper and lower bushings 3 and 4 respectively, each of which is provided with an annular flange bearing against one face of the spindle to hold the same in proper position.

The two-part tool for removing the bushings from the spindle comprises a rod 6 provided with an axial bore 7 formed in one end thereof, the metal surrounding the axial bore being slit longitudinally as indicated at 8 to form two or more flexible fingers 9 integral with the bar 6 and arranged in concentric relation to the axial bore 7. A member 10 cooperates with the rod 6 in effecting removal of the bushings, the member 10 having a head 11, a main body portion 12 and a reduced spindle 13 of suitable size to fit within and be guided by the internal wall of the axial bore 7 to maintain the rod 6 and member 10 in substantial alignment when the parts are in operative position.

The reduced spindle 13 is provided with an annular shoulder 14 formed thereon for engagement with the ends of the flexible fingers 9 as the parts 6 and 10 are forced together, to spread the ends of the flexible fingers outwardly as shown in Fig. 1, and the ends of the flexible fingers 9 have their inner edges beveled slightly as indicated at 15 to facilitate the entry of the shoulder 14 within the bore. A shoulder 16 is provided upon the member 10 spaced slightly from the shoulder 14 which shoulder 16 is so positioned as to engage the ends of the flexible fingers as the members 6 and 10 are forced together and prevent further and excessive spreading of the flexible fingers as well as limiting the extent to which the members 6 and 10 can be forced together. The provision of this shoulder prevents excessive spreading of the fingers and consequent breaking of the fingers or injury to the spindle or tool parts.

It will be seen upon reference to Fig. 2 of the drawings, that while the ends of the flexible fingers are beveled slightly at 15 to permit the entry of the shoulder 14 therebetween the bevel is not of sufficient extent to prevent the shoulder 16 from contacting with the square ends of the fingers and serve as a stop to prevent further movement of the parts toward each other.

In the use of my improved structure the member 10 is inserted in the central opening in one of the bushings, after the manner shown in Fig. 1 and the rod 6 then inserted in the other bushing until the reduced spindle 13 enters the axial bore 7 and fitting closely therein maintains the members 6 and 10, in alignment with each other. The bar 6 may be struck by a hammer or otherwise driven in to force the annular shoulder 14 within the ends of the flexible fingers and thus force the ends of the fingers outwardly within the bore 2 and into position to contact with the inner end of the bushing 4, whereupon by continued driving of the bar 6 the bushing 4 may be forced out of the spindle. It will be noted that the members 6 and 10 are forced together by a straight movement in the direction of their axes, thus preventing any twisting or tilting of the parts relative to each other and the stop shoulder 16 positively prevents excessive spreading of the ends of the flexible fingers.

Having described my invention, what I claim is:

1. A bushing remover of the character described, comprising two parts, one of said parts being formed with an axial socket, expansible fingers concentric with said socket and spaced therearound and a reduced portion formed on said other part for entry into said socket, said reduced portion being provided with an annular shoulder for cooperation with said fingers to spread the same upon insertion of said reduced portion within said socket, and a stop carried by said second part engageable with the ends of said expansible fingers for limiting the extent of movement of said reduced portion within said socket and the degree of expansion imparted to said fingers by said annular shoulder.

2. A tool for removing bushings, comprising two parts, one of said parts comprising a rod provided with an axial bore formed in one end thereof, and expansible fingers surrounding said bore and formed integral with said rod, a two-part tool for removing bushings comprising a rod provided with an axial bore formed in one end thereof, and expansible fingers surrounding said bore and formed integral with said rod, a member cooperating with said rod and provided with a reduced spindle shaped to enter the axial bore in said rod by a straight longitudinal movement relatively thereto, a shoulder on said reduced spindle portion for engaging the ends of said expansible fingers and expanding the same upon entry of said spindle into said bore, and a stop carried by said cooperating member for limiting the extent of entry of said spindle into said bore and the degree of expansion imparted to said fingers.

3. In a bushing remover, a two-part tool, comprising a rod provided with an axial bore formed in one end thereof, and expansible fingers surrounding said bore and formed integral with said rod, and a member cooperating with said rod provided with a reduced portion adapted to fit within and be guided by said bore to retain said cooperating member in substantial alignment with the axis of said rod, a shoulder formed on the reduced portion for engagement with the flexible fingers upon insertion of said reduced portion within said bore to force the expansible fingers outwardly, and a stop carried by said cooperating member for limiting the degree of expansion imparted to said fingers.

In testimony whereof I have affixed my signature.

GEORGE W. DOVER.